United States Patent
Roßberg et al.

(10) Patent No.: US 12,031,878 B2
(45) Date of Patent: Jul. 9, 2024

(54) PRESSURE MEASURING SENSOR

(71) Applicant: Endress+Hauser SE+Co. KG, Maulburg (DE)

(72) Inventors: Andreas Roßberg, Bad Säckingen (DE); Nils Ponath, Lörrach (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 283 days.

(21) Appl. No.: 17/756,929

(22) PCT Filed: Nov. 20, 2020

(86) PCT No.: PCT/EP2020/082853
§ 371 (c)(1),
(2) Date: Jun. 6, 2022

(87) PCT Pub. No.: WO2021/110433
PCT Pub. Date: Jun. 10, 2021

(65) Prior Publication Data
US 2022/0404223 A1  Dec. 22, 2022

(30) Foreign Application Priority Data
Dec. 6, 2019 (DE) ..................... 10 2019 133 325.3

(51) Int. Cl.
*G01L 9/12* (2006.01)
*G01K 7/04* (2006.01)

(52) U.S. Cl.
CPC ............... *G01L 9/125* (2013.01); *G01K 7/04* (2013.01)

(58) Field of Classification Search
CPC ....... G01L 9/02–125; G01K 7/02; G01K 7/04
See application file for complete search history.

(56) References Cited

U.S. PATENT DOCUMENTS

| | | | |
|---|---|---|---|
| 6,588,280 B1 * | 7/2003 | Quigley | G01L 9/125 73/708 |
| 6,615,665 B1 * | 9/2003 | Flogel | G01L 9/0073 361/283.4 |
| 9,791,339 B2 * | 10/2017 | Mullis | G01L 13/025 |
| 10,422,711 B2 * | 9/2019 | Drewes | G01L 9/0048 |
| 11,745,288 B2 * | 9/2023 | Rossberg | C04B 37/021 73/717 |
| 2002/0026835 A1 | 3/2002 | Jacob et al. | |

(Continued)

FOREIGN PATENT DOCUMENTS

| CN | 1373849 A | 10/2002 |
|---|---|---|
| CN | 102472679 A | 5/2012 |

(Continued)

*Primary Examiner* — Justin N Olamit
(74) *Attorney, Agent, or Firm* — Mark A. Logan; Endress+Hauser (USA) Holding, Inc.

(57) ABSTRACT

A pressure measuring sensor having a ceramic pressure sensor includes a temperature transducer to provide a thermovoltage dependent on a temperature gradient. The temperature transducer includes two series-connected thermoelements, each of which has a galvanic contact between a wire of the thermoelement and a connecting conductor connecting the galvanic contacts of the two thermoelements to one another. The temperature transducer enables the compensation for a measuring error caused by a temperature gradient occurring along the pressure measuring sensor.

14 Claims, 2 Drawing Sheets

(56) References Cited

U.S. PATENT DOCUMENTS

2003/0110865 A1    6/2003   Johsson
2015/0346044 A1   12/2015   Mullis et al.

FOREIGN PATENT DOCUMENTS

| CN | 204831163 | U  | 12/2015 |
|----|-----------|----|---------|
| CN | 105228515 | A  | 1/2016  |
| CN | 105593657 | A  | 5/2016  |
| CN | 105829853 | A  | 8/2016  |
| CN | 105917204 | A  | 8/2016  |
| CN | 107148563 | A  | 9/2017  |
| CN | 108351267 | A  | 7/2018  |
| CN | 108463694 | A  | 8/2018  |
| DE | 10044078  | A1 | 4/2002  |
| DE | 10334854  | A1 | 3/2005  |
| DE | 102004057967 | A1 | 6/2006 |
| DE | 102004058504 | A1 | 6/2006 |
| DE | 102009002662 | A1 | 10/2010 |
| DE | 102013114062 | A1 | 6/2015 |
| DE | 202016101491 | U1 | 5/2016 |
| DE | 102015122220 | A1 | 6/2017 |
| DE | 102016105001 | A1 | 9/2017 |
| DE | 102017012057 | A1 | 7/2019 |
| DE | 102018106563 | A1 | 9/2019 |
| EP | 995979    | A1 | 4/2000  |
| EP | 3124937   | A1 | 2/2017  |
| WO | 0220287   | A1 | 3/2002  |

\* cited by examiner

PRESSURE MEASURING SENSOR

CROSS-REFERENCE TO RELATED APPLICATIONS

The present application is related to and claims the priority benefit of German Patent Application No. 10 2019 133 325.3, filed on Dec. 6, 2019, and International Patent Application No. PCT/EP2020/082853, filed Nov. 20, 2020, the entire contents of which are incorporated herein by reference.

TECHNICAL FIELD

The invention relates to a pressure measuring sensor, having
- a ceramic pressure sensor arranged in a housing,
- wherein the pressure sensor comprises a measuring diaphragm, to which can be applied a pressure through an opening in the housing, and an electromechanical transducer for metrologically capturing a deflection of the measuring diaphragm dependent upon the pressure acting on the measuring diaphragm,
- a thrust ring arranged on an outer edge of a rear side, facing away from the diaphragm, of the pressure sensor, and
- a clamping device, by means of which an outer edge region of the pressure sensor is clamped in the housing together with the thrust ring arranged thereon.

The pressure measuring sensors having the features mentioned at the outset are described, for example, in DE 103 34 854 A1, DE 10 2004 057 967 A, and EP 0 995 979 A1 and are used in pressure measuring technology for metrologically capturing pressures.

BACKGROUND

Due to the chemical and mechanical resistance of ceramic, a medium under a pressure to be metrologically captured can be applied directly to ceramic pressure sensors. However, this inevitably leads to both the ambient temperature in the surroundings of the pressure measuring sensor and the medium temperature of the medium under the pressure to be measured having an effect on the measurement properties of the pressure sensor, and thus also on the measurement accuracy that can be achieved with the pressure measuring sensor.

Problematic in this respect are especially applications in which the pressure sensor is exposed to a temperature difference between the medium temperature acting on its measuring diaphragm and the ambient temperature acting on its rear side facing away from the diaphragm. In these applications, the temperature difference leads to the formation of a temperature gradient along the pressure sensor, which can cause thermal expansions that change the measurement properties of the pressure sensor and/or thermomechanical stresses that change the measurement properties of the pressure sensor. Measuring errors caused by temperature gradients along the pressure sensor cannot easily be compensated for based upon a simple temperature measurement.

In order to solve this problem, the pressure sensor of the pressure measuring sensor described in DE 10 2015 122 220 A mentioned at the outset comprises a temperature transducer for providing an electrical variable dependent upon the temperature of the pressure sensor or upon a temperature gradient along the pressure sensor. This temperature transducer comprises at least one thermoelement that has a galvanic contact between a first conductor and a second conductor. In this case, temperature jumps occurring on the diaphragm side can be registered quickly with a thermoelement arranged close to the measuring diaphragm in the pressure sensor. Furthermore, with a temperature transducer having two, series-connected thermoelements, each of which has a galvanic contact between a conductor of the respective thermoelement and a connecting conductor connecting the contacts of the two thermoelements to one another, a direct measurement of a temperature gradient present in the pressure sensor or along the pressure sensor can be carried out. Based upon this temperature gradient, a temperature gradient compensation for the pressure measured by means of the pressure sensor can be carried out according to DE 10 2015 122 220 A by means of an operating circuit connected to the electromechanical transducer of the pressure sensor and to the temperature transducer.

In order to carry out this temperature gradient compensation, however, it is necessary to integrate the thermoelements in the pressure sensor and to connect the temperature transducer of the pressure sensor and the electromechanical transducer of the pressure sensor to the operating circuit. Both lead to restrictions with respect to the sensor construction, and also, where applicable, with respect to the materials used in the pressure sensor, which restrict the design freedom in this regard.

SUMMARY

It is an aim of the invention to specify a pressure measuring sensor of the type mentioned at the outset, which allows a measuring error caused by a temperature gradient occurring along the pressure measuring sensor to be compensated for without restrictions thereby being created with respect to the sensor construction and/or the materials used in the pressure sensor.

To this end, the invention comprises a pressure measuring sensor, having
- a ceramic pressure sensor arranged in a housing,
- wherein the pressure sensor comprises a measuring diaphragm, to which can be applied a pressure through an opening in the housing, and an electromechanical transducer for metrologically capturing a deflection of the measuring diaphragm dependent upon the pressure acting on the measuring diaphragm,
- a thrust ring arranged on an outer edge of a rear side, facing away from the diaphragm, of the pressure sensor,
- a clamping device, by means of which an outer edge region of the pressure sensor is clamped in the housing together with the thrust ring arranged thereon, and
- a temperature transducer for providing a thermovoltage dependent upon a temperature gradient along the pressure measuring transducer, comprising two, series-connected thermoelements, each of which comprises a galvanic contact between an electrical conductor of the respective thermoelement and an electrical connecting conductor connecting the galvanic contacts of the two thermoelements to one another, characterized in that
- an electrically-conductive layer extending in the direction parallel to the surface normal to the measuring diaphragm is arranged on a lateral surface of the thrust ring and forms or comprises the connecting conductor or a conducting portion of the connecting conductor, and the two galvanic contacts comprise one contact facing the process and one contact facing away from the process, which contacts are both arranged in the housing outside the pressure sensor and are spaced apart from each other in the direction parallel to the surface normal to the measuring diaphragm.

In pressure measuring sensors according to the invention, the temperature transducer is designed in such a way that the thermovoltage that can be tapped between the conductors, and accordingly also the temperature gradient that can be metrologically captured by means of the temperature transducer, corresponds to a temperature gradient occurring within the pressure measuring sensor along the temperature transducer or at least along a portion of the temperature transducer in the direction parallel to the surface normal to the measuring diaphragm. This temperature gradient is dependent upon a temperature profile that, in the presence of a temperature difference between the medium temperature and the ambient temperature, forms along the pressure measuring sensor due to the conditions within the pressure measuring sensor. Accordingly, a measuring error, caused by the temperature profile, of the pressure measurement that can be carried out by means of the pressure sensor can be compensated for based upon the temperature gradient.

In this case, the arrangement of the temperature transducer outside the pressure sensor offers the advantage that the temperature transducer and its contacting do not result in any restrictions with respect to the sensor construction and/or the materials used in the pressure sensor.

Furthermore, the extension, predetermined by the positioning of the two contacts, of the temperature transducer in the direction parallel to the surface normal to the measuring diaphragm offers the advantage that this temperature gradient is captured in the spatial direction in which the greatest temperature gradient occurs when a temperature difference between the medium temperature and the ambient temperature exists.

A further advantage is that, due to the spatial proximity between the pressure sensor and the connecting conductor extending over the support body arranged on the pressure sensor, the temperature gradient that can be captured by means of the temperature transducer correlates with the temperature gradient applied along the pressure sensor. Accordingly, in applications in which the temperature profile formed along the pressure measuring sensor does not change at all, or changes only comparatively slowly over time, the temperature gradient that can be captured by means of the temperature transducer forms a direct measure of the temperature gradient that occurs along the pressure sensor, and also has a determining influence on the measuring error caused by the temperature profile. A temperature profile that does not change at all or changes only slowly over time is present, for example, in applications in which the medium temperature and the ambient temperature respectively change over time by an amount of less than one degree Celsius per minute or a few degrees Celsius per minute. In these applications, a compensation for the measuring error of the pressure measurement caused by the temperature profile, which compensation is carried out based upon the temperature gradient metrologically captured according to the invention outside the pressure sensor, results in an improvement in the measurement accuracy which is comparable to the improvement achievable with the temperature transducer integrated in the pressure sensor and described in DE 10 2015 122 220 A.

Optionally, pressure measuring sensors according to the invention can of course also be used in applications in which the medium temperature and/or the ambient temperature, and thus also the temperature profile along the pressure measuring sensor, change more quickly over time. In these applications as well, a measuring error caused by the temperature profile can be compensated for based upon the temperature gradient captured by means of the temperature transducer. In this case, there is also a correlation between the temperature gradient occurring along the temperature transducer and the temperature gradient occurring along the pressure sensor in these applications. However, in these applications, restrictions with respect to achievable improvement of the measurement accuracy may arise in some circumstances if the temperature gradient along the temperature transducer arranged outside the pressure sensor follows the temperature gradient occurring along the pressure sensor with a time lag.

A first development is characterized in that
at least one of the two galvanic contacts is arranged on the conductive layer of the thrust ring, and/or
the galvanic contact facing away from the process is arranged on a region, facing away from the pressure sensor, of the conductive layer, and the galvanic contact facing the process is arranged on a region, facing the pressure sensor, of the conductive layer.

A second development is characterized in that,
in addition to the conducting portion formed by the layer or comprised by the layer, the connecting conductor comprises at least one further conducting portion, and
at least one of the two contacts is arranged on the further conducting portion or on one of the further conducting portions.

A third development is characterized in that
a connection ring is arranged on an end face, facing away from the pressure sensor, of the thrust ring,
a conductive coating which forms or comprises a further conducting portion of the connecting line is arranged on the connection ring and is in electrically-conducting connection to the layer arranged on the thrust ring, and
the galvanic contact facing away from the process is arranged on the coating of the connection ring.

Developments of the third development are characterized in that
the layer arranged on the thrust ring comprises a layer region which extends over an end face, facing the connection ring, of the thrust ring and on which rests a coating region, extending over an end face, facing the thrust ring, of the connection ring, of the coating of the connection ring,
the galvanic contact facing away from the process is arranged on a layer region, extending over an inner lateral surface of the connection ring, of the coating of the connection ring, and/or
the connection ring is clamped in the housing by means of the clamping device.

A fourth development is characterized in that
an electrically-conductive sensor coating which forms or comprises a further conducting portion of the connecting conductor is arranged on a rear side, facing away from the diaphragm, of the pressure sensor,
the sensor coating is in electrically-conducting connection to the layer arranged on the thrust ring, and
the galvanic contact facing the process is arranged on the sensor coating.

Developments of the fourth development are characterized in that the layer comprises a layer region that extends over an end face, facing the pressure sensor, of the support body and rests on a coating region of the sensor coating, the galvanic contact facing the process is arranged on a layer region, spaced apart from the support body, of the sensor coating, and/or the sensor coating is designed as an electromagnetic shielding of the electromechanical transducer of the pressure sensor, which shielding comprises a coating region that surrounds an external lateral surface of the pressure sensor on the outside on all sides.

A fifth development is characterized in that at least one of the two conductors in each case a) is designed as a contact pad, b) comprises an electrically-conductive metal, a metallic alloy, and/or a metal oxide, c) comprises a titanium oxide (TiOx) or a titanium-tungsten oxide (TiWOx), and/or d) comprises an electrically-conductive conductor material whose Seebeck coefficient differs from the Seebeck coefficient of the material of the conducting portion that is in direct contact with the respective conductor.

A sixth development is characterized in that at least one conducting portion of the connecting conductor, the layer, the coating of the connection ring, and/or the sensor coating in each case a1) comprises an electrically-conductive material that, in comparison to platinum, has a Seebeck coefficient with a magnitude of greater than or equal to 6 pV/K or greater than or equal to 10 pV/K, a2) comprises an electrically-conductive metal, a metallic alloy, and/or a metal oxide, a3) comprises a titanium oxide (TiOx), a copper-nickel compound (CuNi), a nickel-vanadium compound (NiV), or a compound comprising nickel-vanadium and gold (NiV/Au), and/or a4) is designed as a layer that is applied by sputtering or by deposition from the gas phase and/or has a layer thickness of greater than or equal to 100 nm or of 1 μm to 2 μm.

A seventh development is characterized in that the connecting conductor comprises the conducting portion formed by the layer or comprised by the layer, and at least one further conducting portion, these conducting portions of the connecting conductor either all consist of the same material or comprise two or more conducting portions made of different materials, and a combination of the same or different Seebeck coefficients of the materials of the conducting portions of the connecting conductor and/or a spatial extension of the further conducting portion or at least one of the further conducting portions is formed in the direction parallel and/or perpendicular to the surface normal to the measuring diaphragm, in such a way that a sum of all the partial thermovoltages that form along the temperature transducer corresponds to the temperature gradients present in the pressure measuring sensor along the temperature transducer or at least along a portion of the temperature transducer in the direction parallel to the surface normal to the measuring diaphragm of the pressure sensor.

An eighth development is characterized in that the support body and/or the connection ring consist of ceramic, and/or a distance between the galvanic contact facing the process and the galvanic contact facing away from the process in the direction parallel to the surface normal to the measuring diaphragm is greater than or equal to a minimum distance of a single installation height of the pressure sensor parallel to the surface normal to the measuring diaphragm and/or less than or equal to a maximum distance of triple this installation height.

A ninth development is characterized in that the temperature transducer is designed in such a way that the thermovoltage that can be tapped between the conductors corresponds to the temperature gradient that can be metrologically captured by means of the temperature transducer, wherein the temperature gradient corresponds to a temperature gradient occurring within the pressure measuring sensor along the temperature transducer or at least along a portion of the temperature transducer in the direction parallel to the surface normal to the measuring diaphragm.

A tenth development is characterized in that the pressure measuring sensor comprises a compensation device designed in such a way that, based upon the pressure metrologically captured by means of the pressure sensor and upon the temperature gradient metrologically captured by means of the temperature transducer, said compensation device determines and provides, based upon calibration data and/or characteristic curves stored in a memory, a pressure measurement result that is compensated for with respect to a measuring error dependent upon the temperature gradient, wherein the compensation device is connected to the transducer of the pressure sensor either directly or via a pressure measuring circuit, which is connected to the transducer of the pressure sensor and is designed to generate and provide a pressure measurement signal corresponding to the pressure metrologically captured by means of the transducer of the pressure sensor, and wherein the compensation device is connected to the temperature transducer either directly or via a temperature measuring circuit, which is connected to the temperature transducer and is designed to generate and provide a temperature measurement signal corresponding to the temperature gradient metrologically captured by means of the temperature transducer.

A development of the pressure measuring sensor according to the third development and the fourth development is characterized in that the coating of the connection ring consists of a material comprising a nickel-vanadium compound, the layer of the support body consists of a material comprising at least one titanium oxide, and the sensor coating consists of a material comprising a nickel-vanadium compound.

The invention and its advantages will now be explained in detail using the figures in the drawing, which show two exemplary embodiments. The same elements are indicated by the same reference numbers in the figures. In order to be able to represent components with in part very different dimensions, true-to-scale representation has been dispensed with.

DETAILED DESCRIPTION

Figure 1:
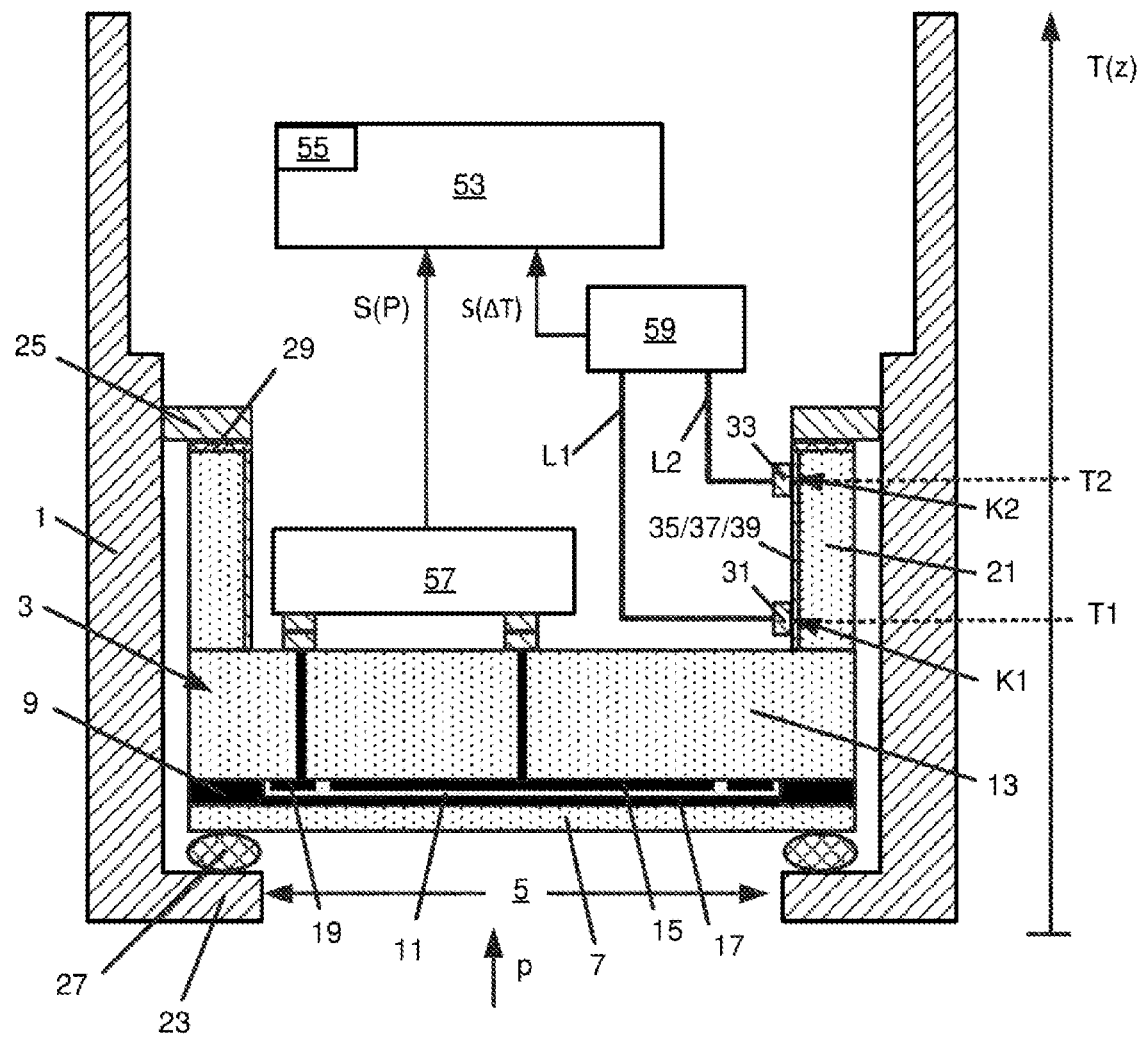
FIG. 1 shows a pressure measuring sensor.

FIG. 1 shows an exemplary embodiment of a pressure measuring sensor according to the invention with a ceramic pressure sensor 3 arranged in a housing 1. The pressure sensor 3 comprises a measuring diaphragm 7 to which can be applied a pressure p through an opening 5 of the housing 1, and an electromechanical transducer for metrologically capturing a bending of the measuring diaphragm 7 dependent upon the pressure p acting on the measuring diaphragm 7.

Ceramic pressure sensors known from the prior art can be used as pressure sensor 3. FIG. 1 shows an example of a pressure sensor 3, the measuring diaphragm 7 of which is connected to a base body 13 by means of a joint 9, such as an active brazing, thereby enclosing a pressure chamber 11.

Transducers known from the prior art can be used as an electromechanical transducer. FIG. 1 shows an example of a capacitive transducer, which comprises a measuring electrode 15 arranged on a surface, facing the measuring diaphragm 7, of the base body 13 and, together with a counter electrode 17 arranged on an inner side, facing the base body 13, of the measuring diaphragm 7, forms a capacitor with a measurement capacitance dependent upon the pressure-dependent bending of the measuring diaphragm 7. Optionally, the transducer can additionally comprise a reference capacitor with a substantially pressure-independent reference capacitance. FIG. 1 shows, as an example, a reference capacitor formed by a reference electrode 19, which surrounds the measuring electrode 15 on the outside and is spaced apart from the measuring electrode 15, and the counter electrode 17.

Instead of the pressure sensor 3 shown here, however, a differently designed capacitive transducer, a transducer based upon a different transducer principle, e.g., a resistive or an optical transducer, and/or ceramic pressure sensors having a different sensor construction can also be used in pressure measuring sensors according to the invention.

In addition, the pressure measuring sensor comprises a thrust ring 21 arranged on an outer edge of a rear side, facing away from the diaphragm, of the pressure sensor 3, and a clamping device by means of which an outer edge region of the pressure sensor 3 is clamped in the housing 1 together with the thrust ring 21 arranged thereon.

A suitable clamping device is, for example, a device in which the pressure sensor 3 and the support body 21 are clamped, in the direction parallel to the surface normal to the measuring diaphragm 7, between a bearing 23, such as the shoulder extending radially inwards, of the housing 1 shown in FIG. 1 and surrounding the opening 5 on the outside on all sides, and a counter bearing 25 inserted into the housing 1 on the side, facing away from the diaphragm, of the pressure sensor 3, such as a thrust ring shown in FIG. 1. A process seal 27 that seals the housing interior from the medium is clamped between the outer edge of the measuring diaphragm 7 and the bearing 23. Optionally, a seal 29, such as a flat seal, is preferably likewise arranged between the end face, facing away from the pressure sensor 3, of the thrust ring 21 and the counter bearing 25.

Furthermore, the pressure measuring sensor comprises a temperature transducer for providing a thermovoltage $U_{th}$ dependent upon a temperature gradient along the pressure measuring sensor, said temperature transducer comprising two, series-connected thermoelements. These thermoelements each comprise a galvanic contact K1, K2 between an electrical conductor 31, 33 of the respective thermoelement and a connecting conductor 35 electrically-conductively connecting the galvanic contacts K1, K2 of the two thermoelements to one another.

According to the invention, an electrically-conductive layer 37 extending in the direction parallel to the surface normal to the measuring diaphragm 7 is arranged on a lateral surface of the thrust ring 21. This layer 37 is designed in such a way that it forms or comprises the connecting conductor 35 or a conducting portion 39 of the connecting conductor 35. In this case, the two galvanic contacts K1, K2 connected to one another via the layer 37 comprise a contact K1 facing the process and a contact K2 facing away from the process. These two contacts K1, K2 are both arranged in the housing 1 outside the pressure sensor 3 and are spaced apart from one another in the direction parallel to the surface normal to the measuring diaphragm 7.

If a measurement situation is considered in which the measuring diaphragm 7 is exposed on the process side to a medium temperature of the medium that is under the pressure p to be measured, said medium temperature being different from an ambient temperature of the pressure measuring sensor, a temperature profile T(z) dependent upon the conditions within the pressure measuring sensor forms along the pressure measuring sensor in the direction z parallel to the surface normal to the measuring diaphragm 7. At the position of the contact K1 facing the process, a temperature T1 prevails that corresponds to the temperature profile T(z) and is different from a temperature T2 that corresponds to the temperature profile T(z) and prevails at the position of the contact K2 facing away from the process. Accordingly, a thermovoltage $U_{th}$ that can be tapped between the two conductors 31, 33 is available via the series-connected thermoelements and corresponds to a temperature gradient ΔT that is present in the pressure measuring sensor along the region of the pressure measuring sensor covered by the temperature transducer in the direction parallel to the surface normal to the measuring diaphragm 7. Consequently, the thermovoltage $U_{th}$, which can be tapped via connecting lines L1, L2 connected to the conductors 31, 33, for example, and/or the temperature gradient ΔT that can be or is metrologically captured based upon the thermovoltage $U_{th}$ can be used to compensate for a measuring error, caused by the temperature profile T(z), of the pressure measurement that can be or is carried out by means of the pressure sensor 3.

Pressure measuring sensors according to the invention have the advantages mentioned at the outset. Individual components can have different embodiments that can each be used individually and/or in combination with one another. Some presently preferred optional embodiments are described below with reference to the pressure measuring sensors shown in FIGS. 1 and 3 and designed in the manner previously described.

One embodiment variant provides that at least one of the two contacts K1, K2 be arranged on the conductive layer 37 of the thrust ring 21.

In this respect, FIG. 1 shows an example in which the galvanic contact K1 facing the process is arranged on a region, facing the pressure sensor 3, of the conductive layer 37 of the support body 21, and the contact K2 facing away from the process is arranged on a region, facing away from the pressure sensor 3, of the conductive layer 37 of the thrust ring 21. In this variant, the conductive layer 37 forms or comprises the connecting conductor 35 with which the conductors 31, 33 of the two thermoelements are connected. Accordingly, the connecting conductor 35 here comprises only a single conducting portion 39 formed by the layer 37 or comprised by the layer 37.

Figure 2:
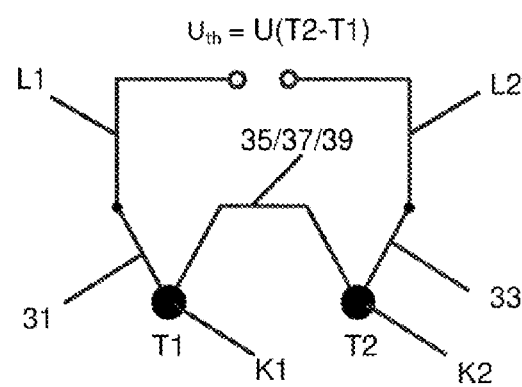
FIG. 2 shows an equivalent circuit diagram of the temperature transducer of FIG. 1.

FIG. 2 shows an equivalent circuit diagram of the pressure transducer shown in FIG. 1. There, the thermovoltage $U_{th}$ that can be tapped between the two conductors 31, 33 via the connecting lines L1, L2 connected thereto is equal to the sum of the temperature-dependent partial thermovoltages that form via the contacts K1, K2. Consequently, the temperature gradient $\Delta T$ that can be or is metrologically captured by means of the thermovoltage $U_{th}$ here corresponds to the temperature difference between the temperature T1 at the position of the contact K1 facing the process and the temperature T2 at the position of the contact K2 facing away from the process.

In pressure measuring sensors according to the invention, the conductors 31, 33 each comprise a conductor material whose Seebeck coefficient differs from a Seebeck coefficient of the material of the conducting portion 39 of the connecting conductor 35 directly adjacent thereto.

Optionally, the conductive layer 37 preferably comprises a material that, in comparison to platinum, has a Seebeck coefficient whose magnitude is as large as possible. Especially materials that, in comparison to platinum, have a Seebeck coefficient with a magnitude of greater than or equal to 6 μV/K, and particularly preferably of greater than or equal to 10 μV/K, are suitable for this purpose. In this respect, particularly suitable materials are materials comprising at least one titanium oxide TiOx, materials comprising a copper-nickel compound CuNi, materials comprising a nickel-vanadium compound NiV, and materials comprising a compound comprising nickel-vanadium and gold NiV/Au. Alternatively, however, other materials with a corresponding Seebeck coefficient, such as materials comprising electrically-conductive metals, metallic alloys, and/or metal oxides and having a corresponding Seebeck coefficient, may also be used.

Alternatively or additionally thereto, in pressure measuring sensors according to the invention, a material combination is preferably used in which the magnitude of the difference between the Seebeck coefficients of the respective conductor material and of the material of the conducting portion 39 of the connecting conductor 35 that is in direct contact with the respective conductor 31, 33 is as large as possible. In conjunction with the materials previously mentioned as an example of the material of the layer 37, conductor materials comprising a titanium oxide TiOx or a titanium-tungsten oxide TiWOx are especially suitable. Alternatively, however, other conductor materials with a corresponding Seebeck coefficient, such as materials comprising electrically-conductive metals, metallic alloys, and/or metal oxides and having a corresponding Seebeck coefficient, may also be used.

Optionally, the two conductors 31, 33 can consist of different conductor materials. Preferably, however, they consist of the same conductor material.

Both the Seebeck coefficient of the material of the conductive layer 37, which is large in terms of magnitude in comparison to platinum, and the differences, which are large in terms of magnitude and provided alternatively or additionally thereto, between the Seebeck coefficient of the material of the layer 37 and the Seebeck coefficients of the conductor materials of the conductors 31, 33 adjacent to the layer 37, respectively bring about an increase in the thermovoltage $U_{th}$ that can be tapped via the two conductors 31, 33, and thus improve the measurement sensitivity and the measurement accuracy of the temperature transducer.

Figure 3:
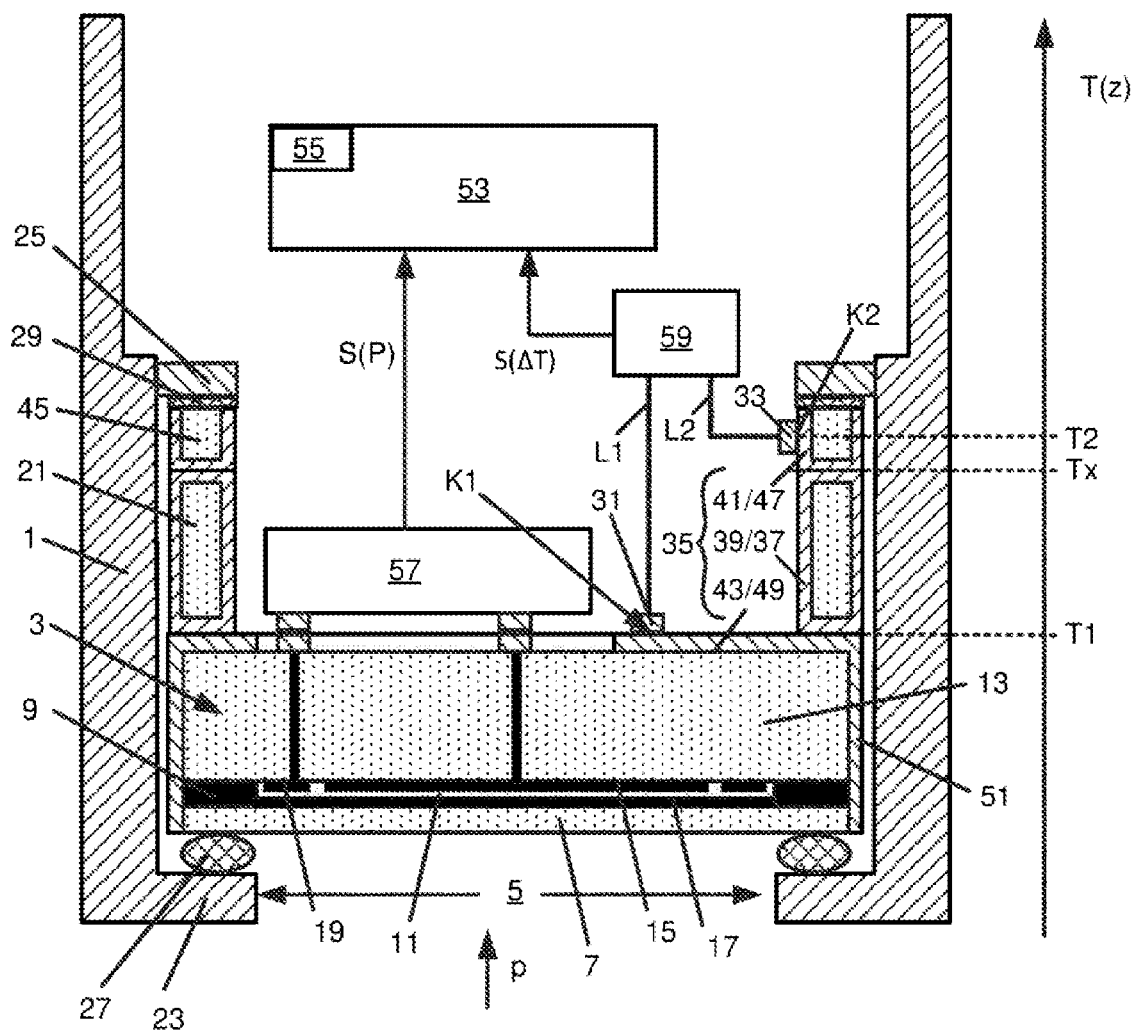
FIG. 3 shows a pressure measuring sensor in which the contact facing away from the process is arranged on a connection ring, and the contact facing the process is arranged on a rear side, facing away from the diaphragm, of the pressure sensor.

As an alternative to the positioning of the two contacts K1, K2 on the layer 37 shown in FIG. 1, the contact facing the process and the contact facing away from the process K1, K2 of pressure measuring sensors according to the invention can, however, also be arranged at a different location within the housing 1. In this case, the connecting conductor 35 connecting the two contacts K1, K2 comprises, in addition to the conducting portion 39 formed by the layer 37 or comprised by the layer 37, at least one further conducting portion 41, 43, and at least one of the two contacts K1, K2 is arranged on one of the further conducting portions 41, 43. FIG. 3 shows an example of a pressure measuring sensor whose connecting conductor 35 comprises three conducting portions 39, 41, 43.

In this embodiment variant, the further conducting portions 41, 43 preferably each consist of the same material as the conducting portion 39 formed by the layer 37 or comprised by the layer 37. This offers the advantage that the connecting conductor 35 having two or more conducting portions 39, 41, 43 behaves with respect to the thermovoltage $U_{th}$ that can be tapped via the two conductors 31, 33 at least approximately like the connecting conductor 35 previously described with reference to FIGS. 1 and 2 and comprising only a single conducting portion 39.

Alternatively, however, the conducting portions 39, 41, 43 of the connecting conductor 35 may also comprise two or more conducting portions 39, 41, 43 of different materials. Suitable materials for the individual further conducting portions 41, 43 are, for example, the materials previously mentioned as examples of the material of the layer 37. In this case, each region of the connecting conductor 35, in which two conducting portions 39, 41, 43 made of materials having different Seebeck coefficients are adjacent to one another, respectively acts like an additional thermoelement which is connected in series to the two thermoelements comprising the galvanic contacts K1, K2 and via which a partial thermovoltage forms. In this case, the size and the polarity of these partial thermovoltages depend upon the temperature profile T(z) present in the region of the respective additional thermoelement and the difference between the Seebeck coefficients of the materials of the respective conducting portions 39, 41, 43 adjacent to one another. In this embodiment variant as well, the temperature transducer is designed in such a way that the sum of all partial thermovoltages that form along the temperature transducer corresponds to the temperature gradient $\Delta T$ present in the pressure measuring sensor along the temperature transducer or at least along a portion of the temperature transducer in the direction parallel to the surface normal to the measuring diaphragm 7 of the pressure sensor 3. This can be brought about, for example, by a corresponding combination of the Seebeck coefficients of the materials of the conducting portions 39, 41, 43 of the connecting conductor 35 and/or a corresponding spatial extension of at least one of the further conducting portions 41, 43 in the direction parallel and/or perpendicular to the surface normal to the measuring diaphragm 7.

In conjunction with connecting conductors 35 having two or more conducting portions 39, 41, 43 as well, material combinations are used in which the conductors 31, 33 each comprise a conductor material whose Seebeck coefficient differs from a Seebeck coefficient of the material of the conducting portion 41, 43 of the connecting conductor 35 directly adjacent thereto. In this case, material combinations are also preferably used here, in which the magnitude of the difference between the Seebeck coefficients of the respective conductor material and of the material of the conducting portion 41, 43 of the connecting conductor 35 that is in direct contact with the respective conductor 31, 33 is as large as possible. In conjunction with the materials previously mentioned as an example of the materials of the conducting portions 39, 41, 43, the conductor materials previously mentioned in conjunction with the pressure measuring sensor shown in FIG. 1 are also suitable here.

The pressure measuring sensor shown in FIG. 3 comprises a connection ring 45 arranged on an end face, facing away from the pressure sensor 3, of the thrust ring 21. A conductive coating 47 is arranged on the connection ring 45 and is in electrically-conductive connection to the layer 37 arranged on the first thrust ring 21. This connection is achieved in the example shown in FIG. 3 in that the layer 37 arranged on the thrust ring 21 comprises a layer region which extends over an end face, facing the connection ring 45, of the thrust ring 21 and on which rests a coating region, extending over an end face, facing the thrust ring 21, of the connection ring 45, of the coating 47 of the connection ring 45. The electrically-conductive connection brought about by the resting contact is additionally reinforced here in that the layer region and the coating region resting thereon are pressed against one another by the clamping device, additionally also here bringing about the clamping of the connection ring 45.

In this example, the coating 47 of the connection ring 45 forms or comprises the further conducting portion 41 of the connecting conductor 35 on which the galvanic contact K2, facing away from the process, of the temperature transducer is arranged. FIG. 3 shows an example in which the galvanic contact K2 facing away from the process is arranged on a layer region, extending over an inner lateral surface of the connection ring 45, of the coating 47 of the connection ring 45. Accordingly, the associated conductor 33 is arranged on the coating region extending over the inner lateral surface of the connection ring 45.

Alternatively or additionally to the arrangement of the contact K2, facing away from the process, on the further conducting portion 41, the contact K1 facing the process can of course also be arranged on a further conducting portion 43 of the connecting conductor 35. In this respect, FIG. 3 shows an example in which a conductive sensor coating 49 is arranged on a rear side, facing away from the diaphragm, of the pressure sensor 3 and is in electrically-conductive connection to the layer 37 arranged on the thrust ring 21. Here, the sensor coating 49 forms or comprises the further conducting portion 43 of the connecting conductor 35, on which the galvanic contact K1, facing the process, of the temperature transducer is arranged. Accordingly, the associated conductor 33 is arranged here on a layer region, spaced apart from the support body 21, of the sensor coating 49.

In this case, the electrically-conductive connection between the sensor coating 49 and the layer 37 arranged on the support body 21 is preferably achieved in that the layer 37 comprises a layer region extending over an end face, facing the pressure sensor 3, of the support body 21, which layer region rests on a coating region of the sensor coating 49. In this case, the coating region of the sensor coating 49 and the layer region of the layer 37 resting thereon are pressed against one another by the clamping device.

If the conducting portions 39, 41, 43 of the connecting conductor 35 of the pressure measuring sensor shown in FIG. 3 consist of the same material, this also results at least approximately in the equivalent circuit diagram shown in FIG. 2.

Figure 4:
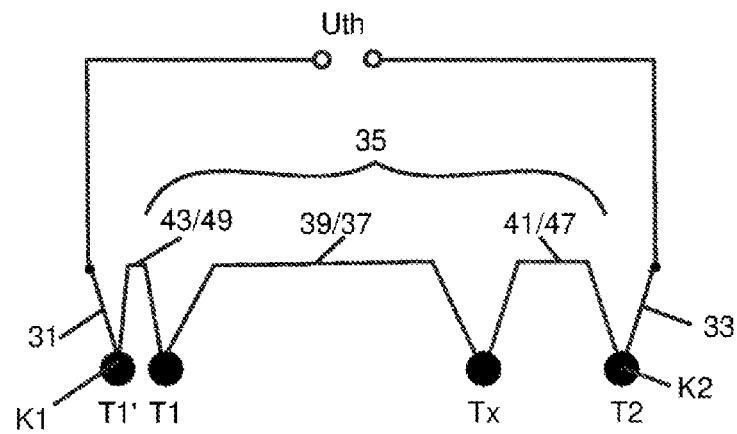
FIG. 4 shows an equivalent circuit diagram of the temperature transducer of FIG. 3.

If the materials of the conducting portions 39, 41, 43 of the connecting conductor 35 comprise two or more materials with different Seebeck coefficients, the equivalent circuit diagram shown in FIG. 4 results. In this embodiment, a material combination is suitable, for example, in which the coating 47 of the connection ring 45 consists of a material comprising a nickel-vanadium compound NiV, the layer 37 of the support body 21 consists of a material comprising at least one titanium oxide TiOx, and the sensor coating 49 consists of a material comprising a nickel-vanadium compound NiV.

If it is assumed that a temperature T1' prevails in the region of the galvanic contact K1 facing the process and is at least approximately equal to the temperature T1 prevailing in the region of the electrically-conductive connection between the layer 37 and the sensor coating 49 due to the orientation of the sensor coating 49 perpendicular to the surface normal to the measuring diaphragm 7 on the rear side of the pressure sensor 3, the contribution of the conducting portion 43, formed by the sensor coating 49 or comprised by the sensor coating 49, to the thermovoltage $U_{th}$ can be considered to be negligibly small. This assumption is regularly fulfilled at least in the presence of an at least approximately stationary temperature profile T(z), and enables a larger design freedom with respect to the material of the sensor coating 49.

Optionally, the sensor coating 49 can also be designed as an electromagnetic shielding of the electromechanical transducer of the pressure sensor 3. In this case, the sensor coating 49 preferably comprises a coating region 51, which is likewise shown as an option in FIG. 3 and surrounds an external lateral surface of the pressure sensor 3 on the outside on all sides.

In a modification of the example shown in FIG. 3, it is of course also possible to use, instead of one of the two contacts K1, K2 shown in FIG. 3, the corresponding contact K1, K2, which is shown in FIG. 1 and in which the associated conductor 31, 33 is arranged on the layer 37 of the support body 21.

Irrespective of the position of the two galvanic contacts K1, K2, the shaping of the associated conductors 31, 33 is freely selectable within comparatively wide limits, and thus flexibly adaptable to the conditions in the housing 1. FIGS. 1 and 3 show an example in which the conductors 31, 33 are each designed as contact pads. This offers the advantage that they only take up very little space in the housing 1 and can each be easily attached, e.g., soldered, to the connecting conductor 35, e.g., to the layer 37, to the coating 47 of the connection ring 45, or to the sensor coating 49.

Alternatively or additionally thereto, the distance between the contact facing the process and the contact facing away from the process K1, K2 in the direction parallel to the surface normal to the measuring diaphragm 7 is preferably greater than or equal to a minimum distance of a single installation height of the pressure sensor 3 parallel to the surface normal to the measuring diaphragm 7 and/or less than or equal to a maximum distance of triple this installation height. In this case, the pressure sensor 3 can have an installation height that is quite common for ceramic pressure sensors 3, such as an installation height on the order of one or more centimeters. The minimum distance offers the advantage that it ensures that, in the presence of a temperature profile T(z) along the temperature transducer, which impairs the measurement accuracy of the pressure measurement, a sufficiently large temperature gradient ΔT that can be captured by means of the temperature transducer occurs. The maximum distance offers the advantage that the expansion of the temperature transducer is thereby limited to a region of the pressure measuring sensor in which the temperature profile T(z) is in close relationship to the temperature gradient that forms across the pressure sensor 3.

Alternatively or additionally to the previously described embodiments, the support body 21 preferably consists of a material whose thermal properties are substantially equal to the thermal properties of the ceramic pressure sensor 3, or at least as similar as possible thereto. For this purpose, the support body 21 preferably consists of ceramic, wherein it preferably consists of the same ceramic as the pressure sensor 3, especially its measuring diaphragm 7 and its base body 13. Likewise, the optionally provided connection ring 45 also preferably consists of this material.

Optionally, at least one conducting portion 39, 41, 43 of the connecting conductor 35, the layer 37 of the support body 21, the coating 47 of the connection ring 45, and/or the sensor coating 49 are each designed as a layer which is applied by sputtering or by deposition from the gas phase and/or has a layer thickness of greater than or equal to 100 nm, and preferably of 1 μm to 2 μm.

As already previously described, the temperature gradient ΔT which can be or is determined by means of the temperature transducer is dependent upon the temperature profile T(z) formed along the pressure measuring sensor and correlates with the temperature gradient present along the pressure sensor 3 due to the structural conditions within the pressure measuring sensor that do not change over time. Accordingly, based upon the thermovoltage $U_{th}$ provided by means of the temperature transducer and/or the temperature gradient ΔT corresponding to the thermovoltage $U_{th}$, the measuring error, caused by the temperature profile T(z), of the pressure p that can be or is metrologically captured by means of the pressure sensor 3 can be compensated for.

This compensation can of course be carried out outside the pressure measuring sensor. Preferably, however, it is carried out by means of a compensation device 53 integrated in the pressure measuring sensor. In this respect, FIGS. 1 and 3 show an example in which the compensation device 53 is arranged in the housing 1 of the pressure measuring sensor. The compensation device 53 is connected to the temperature transducer and to the electromechanical transducer. Additionally, the compensation device 53 is designed in such a way that, based upon the pressure p metrologically captured by means of the pressure sensor 3 and on the temperature gradient ΔT metrologically captured by means of the temperature transducer, said compensation device determines and provides a pressure measurement result that is compensated for with respect to a measuring error dependent upon the temperature gradient ΔT. In this case, the compensation is preferably carried out based upon calibration data of the pressure measuring sensor and/or characteristic curves which are stored in a memory 55 and reflect the dependence of the pressure p captured by means of the pressure sensor 3 upon the temperature gradient ΔT captured by means of the temperature transducer. These calibration data and/or characteristic curves preferably comprise calibration data preferably determined in a calibration method and/or characteristic curves recorded along the pressure measuring sensor during the presence of different, in each case substantially stationary, temperature profiles T(z).

The compensation device 53 can be connected directly to the transducer of the pressure sensor 3. Preferably, however, this connection takes place via a pressure measuring circuit 57 that is connected to the transducer of the pressure sensor 3 and that generates and provides a pressure measurement signal S(P) corresponding to the pressure P metrologically captured by means of the transducer of the pressure sensor 3.

Analogously, the compensation device 53 may also be connected directly to the temperature transducer. Preferably, however, this connection takes place via a temperature measuring circuit 59 that is connected via the connecting lines L1, L2 to the conductors 31, 33 of the temperature transducer and is designed in such a way that it generates and provides, based upon the thermovoltage $U_{th}$ applied between the two conductors 31, 33, a temperature measurement signal S(ΔT) corresponding to the temperature gradient ΔT.

This offers the advantage that the pressure measuring circuit 57 can be arranged at a small distance from the pressure sensor 3, and/or the temperature measuring circuit 59 can be arranged at a small distance from the temperature transducer. As a result, impairments, caused by long transmission paths or external disturbances, of the electrical variable(s) provided by the respective transducer are largely avoided.

The invention claimed is:

1. A pressure measuring sensor, comprising:
   a ceramic pressure sensor arranged in a housing, wherein the pressure sensor includes a measuring diaphragm to which can be applied a pressure through an opening in the housing;
   an electromechanical transducer for metrologically capturing a deflection of the measuring diaphragm dependent upon the pressure acting on the measuring diaphragm;
   a thrust ring arranged on an outer edge of a rear side and facing away from the measuring diaphragm of the pressure sensor;
   a clamping device by which an outer edge region of the pressure sensor is clamped in the housing together with the thrust ring arranged thereon;
   a temperature transducer for providing a thermovoltage dependent upon a temperature gradient, wherein the temperature transducer includes two series-connected thermoelements, each of which includes a galvanic contact between a conductor of the respective thermoelement and a connecting conductor connecting the galvanic contacts of the two thermoelements to one another;
   an electrically conductive layer extending in a direction parallel to a surface normal of the measuring diaphragm and arranged on a lateral surface of the thrust ring, wherein the electrically conductive layer forms or includes the connecting conductor or a conducting portion of the connecting conductor, and
   wherein the two galvanic contacts include one contact facing the process and one contact facing away from the process, wherein the two contacts are both arranged in the housing outside the pressure sensor and are spaced apart from each other in the direction parallel to the surface normal to the measuring diaphragm.

2. The pressure measuring sensor according to claim 1, wherein at least one of the two galvanic contacts is arranged on the conductive layer of the thrust ring, and/or
   wherein the galvanic contact facing away from the process is arranged on a region of the conductive layer facing away from the pressure sensor, and the galvanic contact facing the process is arranged on a region of the conductive layer facing the pressure sensor.

3. The pressure measuring sensor according to claim 2, wherein the connecting conductor further includes at least one further conducting portion, and
   wherein at least one of the two contacts is arranged on the at least one further conducting portion.

4. The pressure measuring sensor according to claim 3, further comprising:
   a connection ring arranged on an end face of the thrust ring and facing away from the pressure sensor; and
   a conductive coating which forms or comprises a further conducting portion of the connecting line, wherein the conductive coating is arranged on the connection ring and is in electrically-conducting connection to the layer arranged on the thrust ring,
   wherein the galvanic contact facing away from the process is arranged on the coating of the connection ring.

5. The pressure measuring sensor according to claim 4,
   wherein the layer arranged on the thrust ring includes a layer region extending over an end face of the thrust ring facing the connection ring and on which rests a coating region, extending over an end face, facing the thrust ring, of the connection ring, of the coating of the connection ring,
   wherein the galvanic contact facing away from the process is arranged on a layer region, extending over an inner lateral surface of the connection ring, of the coating of the connection ring, and/or
   wherein the connection ring is clamped in the housing by the clamping device.

6. The pressure measuring sensor according to claim 5, further comprising:
   an electrically conductive sensor coating that forms or includes a further conducting portion of the connecting conductor, wherein the electrically conducting sensor coating is arranged on a rear side of the pressure sensor facing away from the diaphragm,
   wherein the sensor coating is in electrically-conducting connection to the layer arranged on the thrust ring, and
   wherein the galvanic contact facing the process is arranged on the sensor coating.

7. The pressure measuring sensor according to claim 6,
   wherein the layer includes a layer region that extends over an end face of the support body facing the pressure sensor and rests on a coating region of the sensor coating,
   wherein the galvanic contact facing the process is arranged on a layer region of the sensor coating spaced apart from the thrust ring, and/or
   wherein the sensor coating is designed as an electromagnetic shielding of the electromechanical transducer of the pressure sensor, wherein the shielding includes a coating region that surrounds an external lateral surface of the pressure sensor on the outside on all sides.

8. The pressure measuring sensor according to claim 6, wherein the coating of the connection ring includes a nickel-vanadium compound (NiV), the layer of the support body includes of a material comprising at least one titanium oxide (TiOx), and the sensor coating includes a material comprising a nickel-vanadium compound (NiV).

9. The pressure measuring sensor according to claim 1,
   wherein at least one of the two conductors in each case:
   is designed as a contact pad,
   includes an electrically-conductive metal, a metallic alloy, and/or a metal oxide,
   comprises a titanium oxide (TiOx) or a titanium-tungsten oxide (TiWOx), and/or
   includes an electrically-conductive conductor material having Seebeck coefficient that differs from a Seebeck coefficient of the material of the conducting portion that is in direct contact with the respective conductor.

10. The pressure measuring sensor according to claim 1,
    wherein at least one conducting portion of the connecting conductor, the layer, the coating of the connection ring, and/or the sensor coating in each case:
    includes an electrically-conductive material that, in comparison to platinum, has a Seebeck coefficient with a magnitude of greater than or equal to 6 µV/K or greater than or equal to 10 µV/K,
    includes an electrically-conductive metal, a metallic alloy, and/or a metal oxide,
    includes a titanium oxide (TiOx), a copper-nickel compound (CuNi), a nickel-vanadium compound (NiV), or a compound comprising nickel-vanadium and gold (NiV/Au), and/or
    is designed as a layer that is applied by sputtering or by deposition from the gas phase and/or has a layer thickness of greater than or equal to 100 nm or of 1 µm to 2 µm.

11. The pressure measuring sensor according to claim 1,
    wherein the connecting conductor includes the conducting portion formed by the layer and at least one further conducting portion,
    wherein the conducting portions of the connecting conductor either all consist of the same material or comprise two or more conducting portions made of different materials, and
    wherein a combination of the same or different Seebeck coefficients of the materials of the conducting portions of the connecting conductor and/or a spatial extension of the further conducting portion or at least one of the further conducting portions is formed in the direction parallel and/or perpendicular to the surface normal to the measuring diaphragm such that a sum of all the partial thermovoltages that form along the temperature transducer corresponds to the temperature gradients present in the pressure measuring sensor along the temperature transducer or at least along a portion of the temperature transducer in the direction parallel to the surface normal to the measuring diaphragm of the pressure sensor.

12. The pressure measuring sensor according to claim 1,
    wherein the thrust ring and/or the connection ring consist of ceramic, and/or
    wherein a distance between the galvanic contact facing the process and the galvanic contact facing away from the process in the direction parallel to the surface normal to the measuring diaphragm is greater than or equal to a minimum distance of a single installation height of the pressure sensor parallel to the surface normal to the measuring diaphragm and/or less than or equal to a maximum distance of triple this installation height.

13. The pressure measuring sensor according to claim 1,
    wherein the temperature transducer is designed such that the thermovoltage that can be tapped between the conductors corresponds to the temperature gradient that can be metrologically captured by means of the temperature transducer, and
    wherein the temperature gradient corresponds to a temperature gradient occurring within the pressure measuring sensor along the temperature transducer or at least along a portion of the temperature transducer in the direction parallel to the surface normal to the measuring diaphragm.

14. The pressure measuring sensor according to claim 1, further comprising:
a compensation device designed such that, based upon the pressure metrologically captured by the pressure sensor and upon the temperature gradient metrologically captured by the temperature transducer, the compensation device determines and provides, based upon calibration data and/or characteristic curves stored in a memory, a pressure measurement result that is compensated for with respect to a measuring error dependent upon the temperature gradient,
wherein the compensation device is connected to the transducer of the pressure sensor either directly or via a pressure measuring circuit that is connected to the transducer of the pressure sensor and is designed to generate and provide a pressure measurement signal corresponding to the pressure metrologically captured by means of the transducer of the pressure sensor, and
wherein the compensation device is connected to the temperature transducer either directly or via a temperature measuring circuit that is connected to the temperature transducer and is designed to generate and provide a temperature measurement signal corresponding to the temperature gradient metrologically captured by the temperature transducer.

* * * * *